Dec. 16, 1941. A. L. BOEGEHOLD ET AL 2,266,305
WEAR TESTING MACHINE
Filed Aug. 12, 1939 3 Sheets-Sheet 1

Inventors
Alfred L. Boegehold &
Walter E. Jominy
By Blackmore, Spencer & Flint
Attorneys Dec. 16, 1941. A. L. BOEGEHOLD ET AL 2,266,305
WEAR TESTING MACHINE
Filed Aug. 12, 1939    3 Sheets-Sheet 3
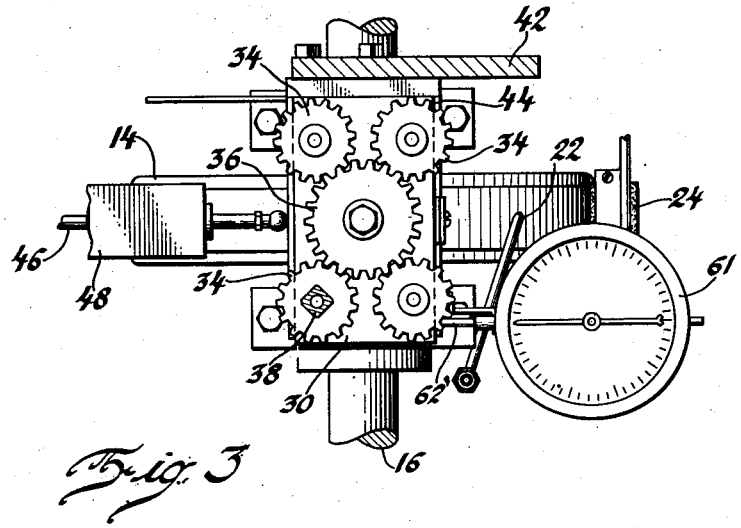
Fig. 3
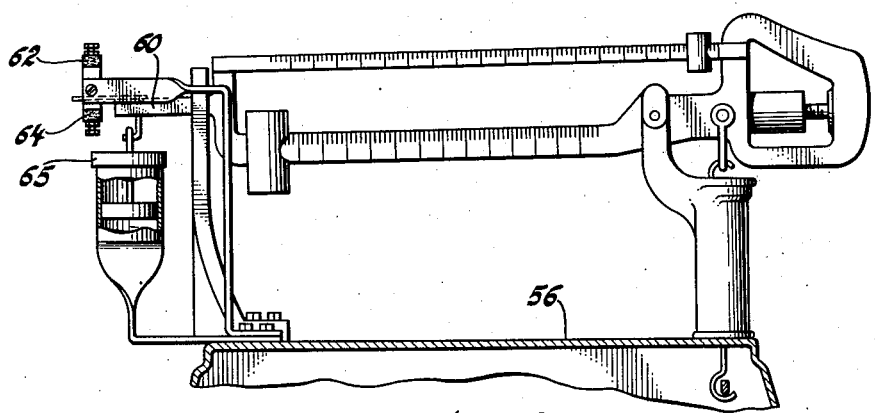
Fig. 4
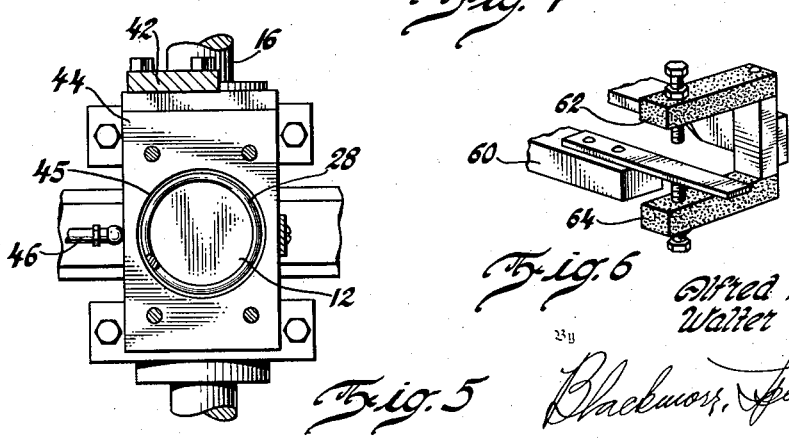
Fig. 5
Fig. 6
Inventors
Alfred L. Boegehold &
Walter E. Jominy
By Blackmore, Spencer & Flint
Attorneys Patented Dec. 16, 1941

2,266,305

UNITED STATES PATENT OFFICE 2,266,305

WEAR TESTING MACHINE

Alfred L. Boegehold and Walter E. Jominy, Detroit, Mich., assignors to General Motors Corporation, Detroit, Mich., a corporation of Delaware Application August 12, 1939, Serial No. 289,750

6 Claims. (Cl. 73—51)

This invention relates to wear testing and more particularly to improvements in machines for testing the wear resisting properties of metals and the like.

One object of the present invention is to provide a machine for testing the wear resisting properties of a metal object that is more accurate than other forms of machines used for similar purposes and in which it is possible to duplicate results with a degree of accuracy not heretofore obtainable.

Another object of the invention is to provide a wear testing machine which is especially adapted to operate on pieces of relatively small size and in which the results obtained on relatively small samples parallel those obtained in service tests.

The above and other objects of the invention will be more fully understood as the invention is hereinafter further disclosed.

In carrying the invention into effect a wear testing machine is provided in which a test specimen of suitable size and shape is resiliently held in contact with the periphery of a rotating member such as a wheel, disc, or drum and the force of friction is kept constant or substantially so during the testing operation.

Reference is made to the accompanying drawings illustrating an embodiment of the invention, in which:

Figure 3 is a view taken on line 3—3 in Figure 1.

Figure 4 is a view taken on line 4—4 in Figure 1.

Figure 5 is a view taken on line 5—5 of Figure 1.

Figure 6 is a detail perspective view of switch contacts for controlling a motor for changing the loading on the test specimen.

Figure 1:
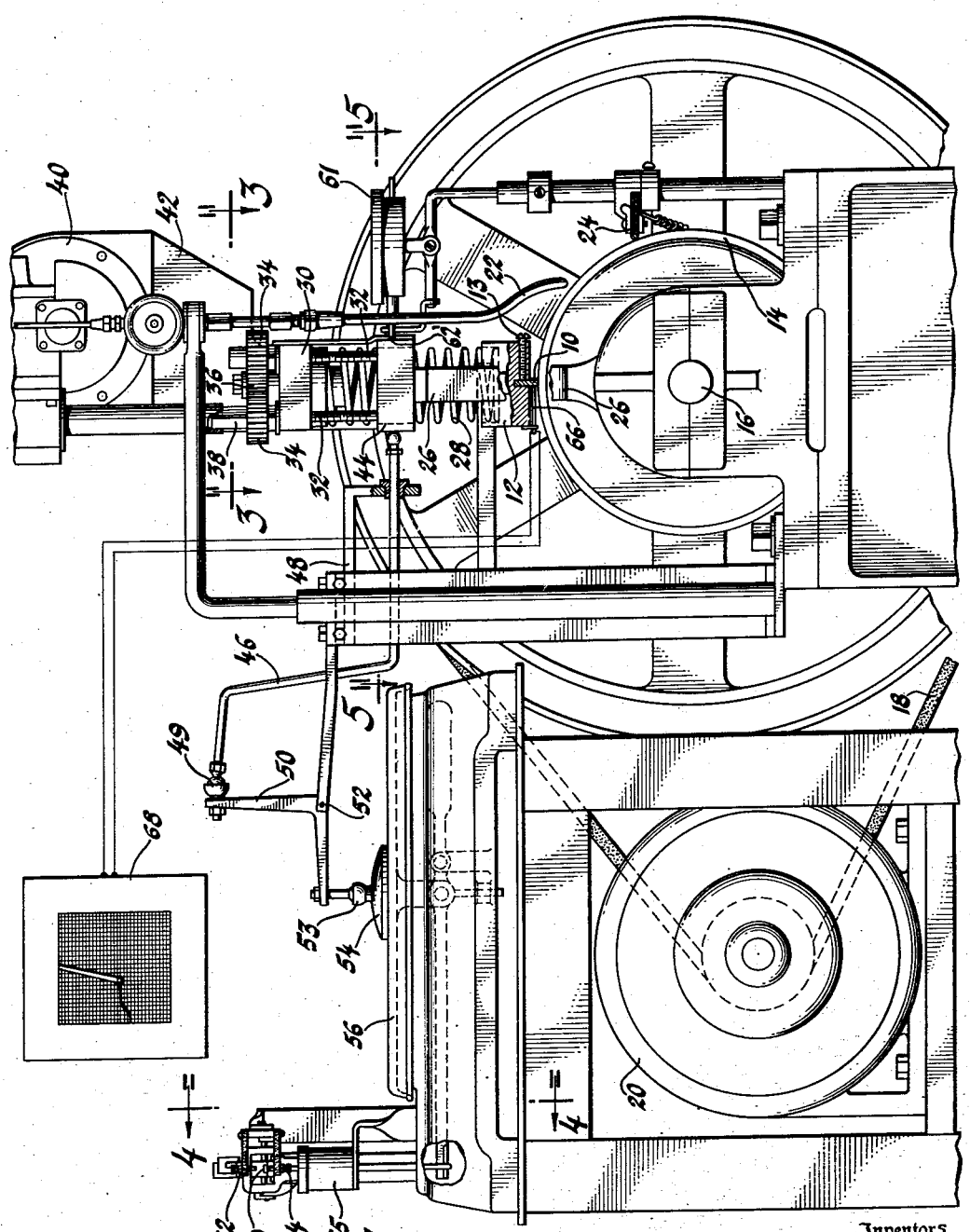
Figure 1 is a side elevational view with parts in section of a wear testing machine constructed in accordance with the invention.
Figure 2:
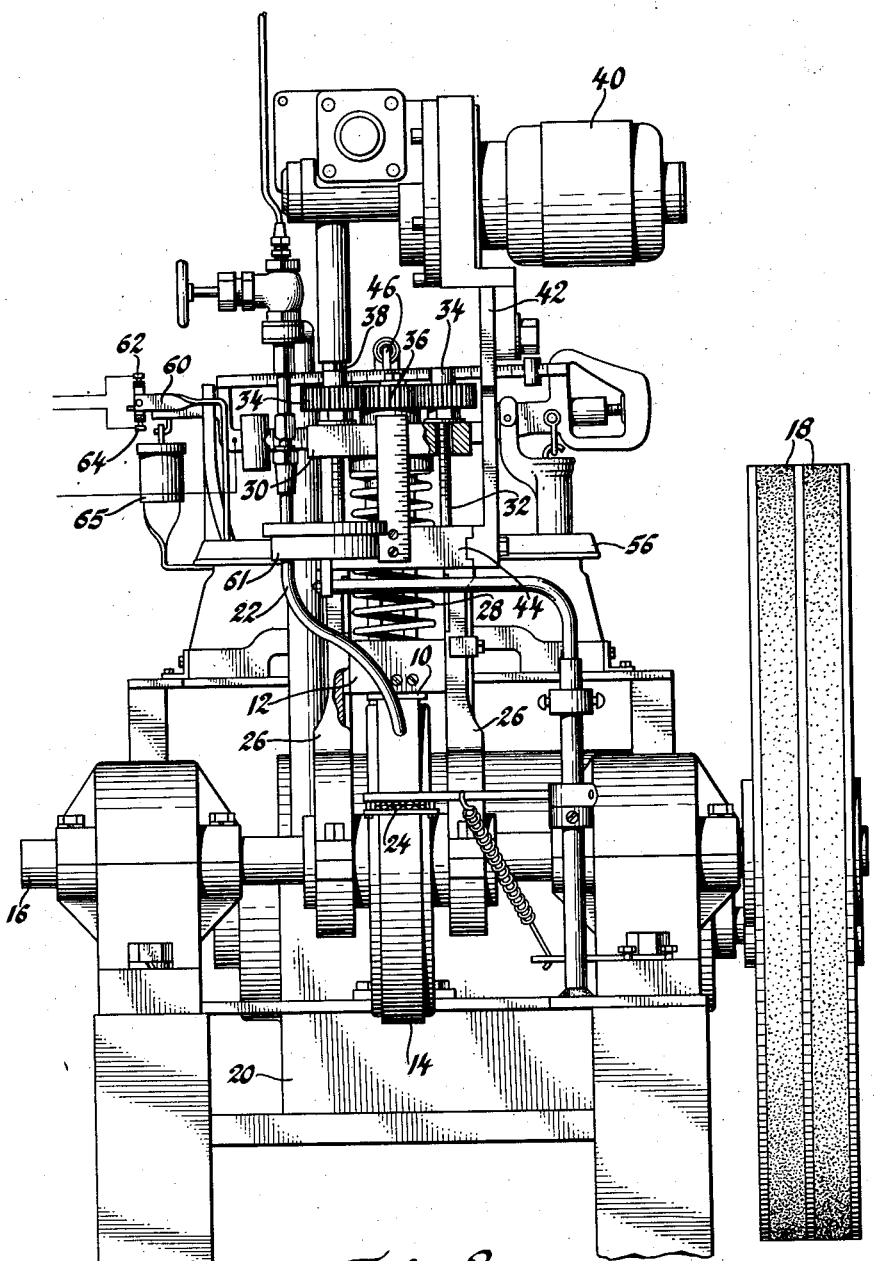
Figure 2 is an end elevational view of the machine of Figure 1.

In the drawings is indicated a test specimen 10 mounted in a suitable support or block 12 and held in fixed position therein during a testing operation by screw 13. The test specimen bears against the peripheral surface of a rotatable wheel or disc 14. In the form shown in the drawings the test specimen is of a length slightly greater than the width of the wheel or disc and is comparatively narrow. Wheel 14 is secured to a shaft 16 mounted in suitable bearings and driven in any desired manner, as by means of belt 18 from electric motor 20.

The contacting or friction surfaces of the wheel and test specimen are preferably kept wet or lubricated by an oil and kerosene mixture supplied through pipe 22, the excess being removed by a pad 24.

The block or support 12 is slidably mounted in guides provided on swinging arms 26 journaled on the shaft 16. The block 12 and test sample are subject to the compression of coil spring 28 which reacts at its upper end against block 30 slidably mounted on threaded studs 32 provided at their upper ends with nuts 34 having gear teeth formed on their peripheries as shown. An idler gear 36 completes the train of gears formed by the nuts, and one of the nuts is slidably engaged by a square shaft 38 driven by suitable gearing by the reversible motor 40. This motor is mounted on a bracket 42 rigidly secured to a plate 44 which rigidly connects the upper ends of pivoted arms 26, the plate 44 having an aperture 45 to permit the passage of spring 28. If desired the motor 40 may be connected to the idler gear 36 instead of to any one of the members 34. In the light of the foregoing it will be apparent that the rotation of the motor 40 will cause the nuts to be rotated on the studs 32, rotation in one direction forcing plate 30 downwardly to increase the compression of spring 28 and rotation in the opposite direction permitting the spring to move the plate 30 upwardly and reduce the compression of the spring against block 12 and test specimen 10.

The friction between the specimen 10 and wheel 14 exerts a drag on the specimen and thus on the pivoted arms 26 and all the parts carried thereby including the nuts, motor 40, etc. This drag tends to rotate these parts about the axis of the shaft 16 and is an indication of the amount of friction produced. To measure the drag there is provided an arm 46 adapted to reciprocate in a suitable fixed guide 48, said arm having one end engaging one side of the plate 44 and having its opposite end connected by a ball and socket connection 49 with one end of a rockshaft or bell crank 50 pivoted at 52. The other end of the rockshaft is connected by a ball and socket connection 53 with a member 54 bearing on the platform of a platform scale indicated at 56.

One end of the beam of the platform scale indicated at 60 is arranged to make contact at 62 or 64 to close circuits controlling the motor 40. When beam end 60 is in raised position in engagement with contact 62 the circuit to the motor 40 is closed to cause the motor to rotate in one direction to decrease the spring pressure and when beam end 60 is in low position in engagement with contact 64 the motor circuit is closed to rotate the motor 40 in the opposite direction to increase the spring pressure. A suitable dash pot 65 may be provided for preventing too rapid movement of the beam end 60.

Obviously, when the friction, and, therefore, the frictional drag of the specimen 10 on the wheel 14 increases, the swinging frame carrying the specimen is rotated counterclockwise as shown in Figure 1 forcing rod 46 to the left causing foot 54 to bear more heavily on the scale and consequently causing beam end 60 to close the contact at 62. This closes the circuit to cause motor 40 to revolve in a direction to shift the nuts 34 upwardly, slightly relieving the compression of spring 28. This continues until the beam end 60 is moved downwardly out of engagement with contact 62, breaking the motor circuit. Should the friction on the specimen decrease, the pressure of foot 54 on the scale will decrease, the beam end 60 will swing downwardly closing contact at 64 and cause the motor 40 to screw down the nuts 34, thereby increasing the compression of spring 28, and consequently the frictional contact of specimen 10 with wheel 14.

It will be understood that the amount of adjustment of the block 30 produced by movement of the gears in either direction is comparatively slight, and, of course, the whole arrangement is automatic.

At 61 there is indicated another gage having a feeler 62' bearing against the other side of the block 12. This gage likewise measures the amount of swing of the arms 26 and the parts assembled on it.

At 66 there is indicated a thermocouple which records at 68 the changes in temperature due to friction. If on account of some unusual circumstance, the temperature rises faster than can be compensated for by the automatic reduction of the spring tension of spring 28, recorder 68 may be set to cut off the current to motor 20.

The advantage of the described arrangement is that by maintaining a substantially constant drag of the specimen 10 on the wheel 14 by automatically adjusting the pressure of the specimen on the wheel the temperature of the specimen may be maintained substantially constant, and the rate of wear is likewise maintained constant. The arrangement also compensates for wearing away of the specimen. The amount of wear is determined by weighing the specimen before and after test.

The wheel 14 is preferably formed of cast iron or other metal or alloy that is wear and score resistant. In the form of the invention illustrated in the drawings the wheel is made large as compared with the test specimen so that the wear on the wheel is small as compared with that of the test specimen. In order to obtain uniform results it is desirable to have the surface of the wheel in the same condition before each test. This may be accomplished by a suitable grinding operation between each test. Care should be taken also in cleaning the parts before each test and in controlling the rate of load application.

If desired, the wheel 14 may be made much smaller as compared with the size of the test specimen 10 than that shown in the drawings and the wear of both the wheel and test specimen measured.

Various changes in, and modifications of, the embodiment of our invention described herein may be made without departing from the principle of our invention and therefore we do not intend to limit the patent granted for our invention except as necessitated by the prior art.

We claim:

1. In a wear testing machine, a rotary member, a support for holding a test specimen in frictional engagement with said rotary member, means for measuring the force of friction between said rotary member and said test specimen, and means controlled by operation of said force measuring means for automatically maintaining the force of friction between the rotary member and test specimen substantially constant as wear occurs.

2. In a wear testing machine, a rotary member, a support for holding a test specimen, spring means engaging said support for resiliently holding a test specimen in frictional contact with the rotary member, means for measuring the force of friction between said rotary member and said test specimen and means controlled by operation of said force measuring means for automatically maintaining the friction between the test specimen and rotary member substantially constant by automatically changing the pressure between the test specimen and rotary member as wear occurs an amount sufficient to maintain a substantially constant frictional force between the rotary member and test specimen.

3. In a wear testing machine, a rotary member, arms pivoted about the axis of the rotary member, a support slidably carried by the arms for holding a test specimen, spring means acting on said support for resiliently holding a test specimen in frictional engagement with the rotary member, means for measuring the frictional force tending to rotate the test specimen about the axis of the rotary member, and means for automatically maintaining the friction between the rotary member and test specimen substantially constant by automatically changing the spring pressure on said test specimen as wear occurs an amount sufficient to maintain a substantially constant frictional force between the rotary member and test specimen.

4. In a wear testing machine, a rotary member, arms pivoted about the axis of said rotary member, a spring loaded support slidably carried by said arms for resiliently holding a test specimen in contact with the rotary member, a platform scale, means connecting the pivoted arms and platform scale to measure the force tending to rotate the pivoted arms about the axis of the rotary member, and means for maintaining said force substantially constant during a testing operation, said last mentioned means including a reversible motor adapted to rotate in one direction when the beam of the platform scale is in low position and to rotate in the opposite direction when the beam is in high position and means moved by said reversible motor when the beam of the scale is in low position to compress the springs of the spring loaded support to increase the pressure between the test specimen and rotary member and moved by the reversible motor in its opposite direction of rotation when the beam of the platform scale is in high position to decrease the pressure between the test specimen and rotary member to thereby maintain the force of friction between the test specimen and the rotary member substantially constant as wear occurs.

5. In a wear testing machine, a rotary metallic disc, a support for holding a metallic test specimen, spring means acting on said support for resiliently holding a metallic test specimen in frictional contact with the periphery of said rotary disc, means for measuring the force of friction between the rotary disc and test specimen and means controlled by operation of said force measuring means for maintaining the force of friction between said test specimen and rotary disc substantially constant by automatically changing the force of the spring means acting on said support an amount sufficient to maintain a substantially constant frictional force between said rotary disc and said test specimen as wear occurs.

6. In a wear testing machine, a rotary member, arms pivoted about the axis of said rotary member, a support slidably carried by the arms for holding a test specimen, spring means acting on said support to force the test specimen into resilient and frictional engagement with said rotary member, a force measuring means, means connecting the pivoted arms and force measuring means to measure the frictional force tending to rotate the pivoted arms about the axis of the rotary member, and means controlled by operation of the force measuring means for maintaining said frictional force substantially constant during a testing operation by automatically changing the pressure exerted by the spring means on said test specimen.

ALFRED L. BOEGEHOLD.
WALTER E. JOMINY.